United States Patent [19]

Thompson

[11] 4,009,486
[45] Feb. 22, 1977

[54] DIGITAL ENCODING SYSTEM
[75] Inventor: John Edward Thompson, Watford, England
[73] Assignee: The Post Office, London, England
[22] Filed: Aug. 20, 1975
[21] Appl. No.: 605,994
[30] Foreign Application Priority Data
  Aug. 23, 1974 United Kingdom ............ 37280/74
[52] U.S. Cl. ................................................ 358/13
[51] Int. Cl.² ......................................... H04N 9/02
[58] Field of Search ............... 358/13; 178/DIG. 3, 178/6, 6.8

[56] References Cited
UNITED STATES PATENTS 3,800,225  3/1974  Meares ................................ 358/13
3,921,204  11/1975  Thompson ........................ 358/13

Primary Examiner—John C. Martin
Attorney, Agent, or Firm—Hall & Houghton

[57] ABSTRACT

Method and apparatus for the conversion to and from digital form of a PAL color television signal is described in which the digital signals represent the error between a particular sampled value of the signal and a predicted value for that particular sample, the predicted value being based on a previously occurring sampled value together with the difference between two similarly spaced sampled values occurring in the preceding line, the spacing of the two pairs of sampled values in the two lines being such that the phase change of the sub-carrier, if unmodulated, is the same in both cases. A simple switch delay system is described for effecting the selection of the sampling instants in the preceding line.

12 Claims, 4 Drawing Figures

DIGITAL ENCODING SYSTEM

This invention relates to the digital encoding of an analogue signal.

It has been proposed to effect the encoding of an analogue signal including a base band component and a modulated sub-carrier wave by sampling the signal at a regular succession of sampling instants and at each sampling instant comparing an instantaneous value of the analogue signal with a previous value of the signal, the difference between them being encoded in digital form, in which the sampling instants are chosen so that the phase of the sub-carrier, if unmodulated, in the previous value of the signal, is the same as in the instantaneous value. This method is of particular value in digitally encoding a colour television signal, and it has been found desirable to prepare a prediction for the instantaneous value not only from values in the same scanning line, but from nearby values in a preceding scanning line or lines, and to produce the difference between the predicted and actual values. However, the alternation of the phase of the sub-carrier embodied in the PAL colour television system makes it difficult to provide a prediction using values in the immediately preceding scanning line and hitherto it has been necessary to separate the base band luminance component from the sub-carrier wave carrying the chrominance information.

It is an object of the present invention to provide a method of digitally encoding a PAL colour television signal in which the above difficulty is substantially avoided.

According to the present invention there is provided a method of digitally encoding a PAL colour television signal having a base band luminance component and a phase and amplitude modulated sub-carrier wave representing chrominance, the sense of the phase modulation being switched about a datum phase to as to alternate in successive lines, in which at each of a regular succession of sampling instants an instantaneous value of the signal has subtracted from it a combination of previously sampled values of the signal, the difference being encoded in digital form; wherein the sampling frequency is three times the frequency of the sub-carrier, with sampling instants synchronised with the datum phase of the sub-carrier or a phase in quadrature with the datum phase, and the value of the signal at a present sampling instant has subtracted from it both the value at a preceding sampling instant and the difference between the values at first and second sampling instants approximately one line period earlier, the value at the first sampling instant being subtracted from the value at the second sampling instant to produce the last-mentioned difference, the first and second sampling instants being chosen so that they are spaced the same number of sampling intervals as the present and preceding sampling instants, and that the sub-carrier components, if unmodulated, would cancel each other.

The invention also provides a method of decoding a digitally coded television signal produced by a method of encoding according to the preceding paragraph and a television transmission system incorporating encoding and decoding as just described.

If the sampling instants are synchronised with a phase of the sub-carrier signal which is in quadrature with the datum phase, the first and second sampling instants are chosen so that the phase of the sub-carrier, if unmodulated, at the first sampling instant is opposite to that at the present sampling instant, and that at the second sampling instant is opposite to that at the preceding sampling instant the value at which is subtracted from that at the present sampling instant.

If sampling instants are synchronised with a phase of the sub-carrier in quadrature with the datum phase, it is possible to find groups of sampling instants in the preceding line such that the first and second sampling instants are adjacent to one another and do not depart appreciably from a position vertically above the present sampling instant. The use of a group of four adjacent sampling instants in the preceding line in this way enables a simple apparatus to be constructed to carry out the method, in which a simple cyclic switching operation is all that is required to compensate for the difference between the different sampling instants relative to the phase of the sub-carrier. One example of such apparatus is described below. The cyclic switching may be disabled for the processing of black and white television signals.

With the selection of sampling instants synchronised with the datum phase of the sub-carrier, it is necessary to use first and second sampling instants in the preceding line which are separated by a single sampling instant, that is to say they are twice as far apart as the first and second sampling instants which can be used if the instants are synchronised with the phase which is in quadrature with the datum phase.

In order that the invention may be fully understood and readily carried into effect, it will now be described with reference to the accompanying drawings, of which:

Figure 1:
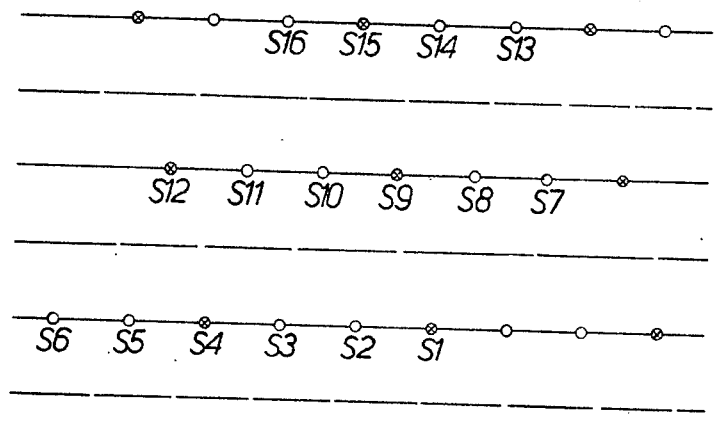
FIG. 1 is a diagram of a 625 line raster showing sampling points corresponding to a sampling rate of 13.3 MHz, that is to say three times the colour sub-carrier frequency.

In FIG. 1, the sampling points are marked by small circles, and those which are to be referred to subsequently for explaining the operation of an example of the invention are indicated by references S1 to S16. For facilitating the understanding of the invention, it will be described with reference to a present sampling instant indicated by the reference S1, and all points corresponding to the same basic sub-carrier phase of a PAL colour television signal as S1 are indicated by a cross. It will be appreciated that the phase modulation of the sub-carrier is alternating in successive lines, this being a feature of the PAL system and is used for correcting hue errors due to varying phase shift in the signal path. The colour sub-carrier frequency is an odd integral multiple of quarter line frequency and the sampling frequency chosen is three times the colour sub-carrier frequency or 13.30085625 MHz. As a result of this choice of sampling frequency the sampling points having the same sub-carrier phase are disposed as shown in FIG. 1. The system uses an interlaced scan and the intervening lines, the points of which are not referrd to herein, are indicated by dashed lines.

In one example of the present invention, it is proposed to predict the value which will occur at sampling instants S3, S2 and S1 in accordance with the following sequence of three algorithms $$S1 = S2 + S8 - S9$$

$$S2 = S3 + S10 - S11$$

$$S3 = S4 + S9 - S10$$

Considering the algorithm for S1, the prediction for the value at S1 is based on the assumption that the luminance or base band component difference between the values at S1 and S2 will be the same as the corresponding difference between the values at S8 and S9. This assumes that an edge which occurs between S8 and S9 will also occur between S1 and S2. Compensation for the phase variation of the sub-carrier component will now be considered with reference to FIG. 2.

Figure 2:
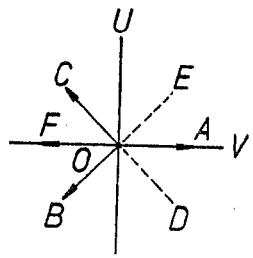
FIG. 2 is a phase diagram to be used in explaining the operation of a method according to the present invention.

In the example of the invention under consideration, because the sampling frequency is three times the sub-carrier frequency, it follows that the phases of the sub-carrier signal at which sampling is carried out are separated by 120°. Also in this example one of the sets of sampling instants is arranged to lie along the V-axis of the sub-carrier phase diagram shown in FIG. 2. This phase diagram, which is frequently used during consideration of processing of a PAL television signal, has a vertical U-axis and a horizontal V-axis, with the phase alternation taking place by switching about the U-axis. In PAL systems as at present constructed, the V-axis is aligned with the phase of the sub-carrier signal which is amplitude modulated by the red colour difference signal and the U-axis is aligned with the phase of the sub-carrier signal which is amplitude modulated by the blue colour difference signal. As shown in FIG. 2, the sampling instants occur at phases of the sub-carrier signals represented by OA, OB and OC. Supposing that the sampling instant S1 is aligned with the phase of the sub-carrier along the V-axis, then the line OA represents the phase of the sub-carrier for sampling instants S1 and S4. Because of the phase inversion due to the PAL switching the phase of the sub-carrier at instants S9 and S12 is indicated by OF, or opposite to OA. The sense of rotation of phase in FIG. 2 is clockwise with the result that OB represents the phase of the sub-carrier signal at S3 and at the sampling instant following S1. As a result of the action of the PAL switch the phase of the sub-carrier at S8 and S11 is represented by the line OD, which is opposite in phase to OC. OC represents the phase of the sub-carrier at S2 and S5, and the phase at S7 and S10 is represented by OE, OE being opposite in phase to OB. Referring again to FIG. 1, the phase at S2 is opposite to the phase at S8 (because OC is opposite OD) and consequently the sub-carrier components at S2 and S8 substantially cancel out when the values at S2 and S8 are added together, assuming that there is no colour change between these points. As a result the prediction for S1 given by the algorithm reduces to $S1 = -S9$ as far as the sub-carrier component is concerned. Since the sub-carrier phase of the value at S9 is represented by OF, it is substantially equal to −OA which is the sub-carrier phase at S1, again assuming that there is no substantial colour change between S1 and S9. Therefore when the prediction for S1 is used in differential coding of the television signal, the difference produced is reduced to the extent that the luminance changes in the preceding line reflect the changes in the present line, and the influence of changes in phase of the sub-carrier between sampling instants is also eliminated. The difference will, however, have a component which depends on the colour changes in both lines.

A similar explanation is applicable to the prediction for the value at instant S2 and predictions for the values at S2 and S3. A slight disadvantage in the prediction chosen for S3 will be evident because of the misalignment of S9 and S10 relative to S3 and S4, but this is only likely to be of significance on a sharp edge sloping up to the left.

The use of the algorithms described above as predictions for the value of the signal in producing a digital encoding of the signal is based upon forming the difference between the actual values which occur at a particular sampling instant and the value predicted for it. Of course, if the prediction were perfect, there would be no error between the predicted value and the actual value, and the encoded output would be zero, but in practice there is usually an output the magnitude of which is dependent on the effectiveness of the prediction, which is transmitted in digital form after a further stage of quantisation. A receiver for the digital signal so produced would of course incorporate the same kind of prediction circuit which will be subjected to successive corrections correspondng to the errors between the actual sampled value and the predicted value for the sample.

Figure 3:
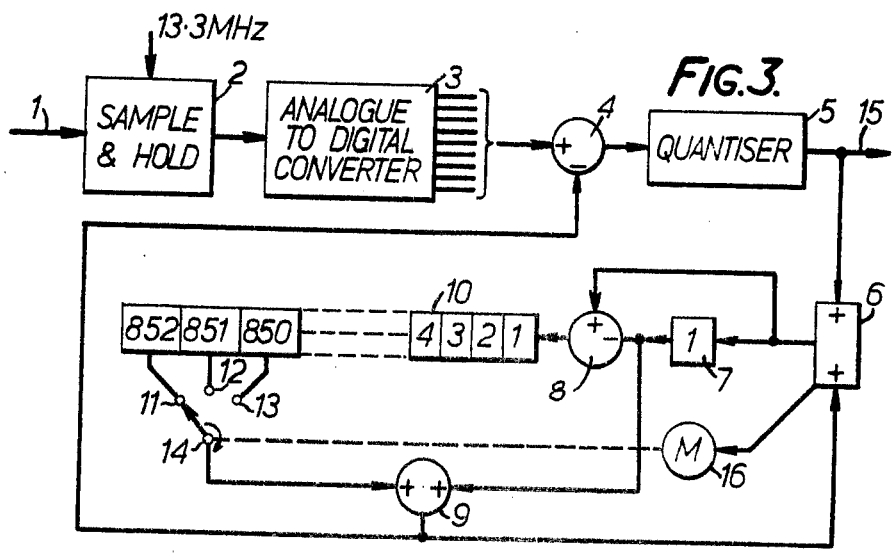
FIG. 3 is a block diagram of one form of apparatus for executing the method.

FIG. 3 shows in block diagrammatic form an example of apparatus for producing a digitally encoded signal representing a PAL colour television signal. In FIG. 3 the television signal, that is to say the luminance signal together with the phase modulated sub-carrier signal is applied via a conductor 1 to a sampling and holding circuit 2. A sampling signal of just over 13.3 MHz, equal to three times the sub-carrier frequency, is applied to the circuit 2 for effecting the sampling. The sampling signal is synchronised with a phase of the sub-carrier so that one set of sampling instants occurs at a phase which is in quadrature with the datum phase of the sub-carrier about which the sense of phase modulation is switched by the PAL switch. The analogue sampled value from the circuit 2 is applied to an analogue to digital converter 3 from which a digital signal is applied to a subtractor 4. The difference signal from the subtractor 4 is quantised in a quantizer 5 the output from which forms the digital output of the circuit on channel 15 and is applied as an input to an adder 6. The sum signal from the adder 6 is applied to a delay circuit 7, imposing a delay of one sampling period on the sum signal, and also to an input of a subtractor 8. The output of the delay circuit 7 is applied to the subtracting input of the subtractor 8 and also to an input of an adder 9. The difference output from the subtractor 8 is applied to a 852 stage shifting register 10, from the last three stages of which outputs are taken to apply to contacts 11, 12 and 13 of a commutating switch having a commutating contact 14 driven by a motor 16 which connects with the contacts 11, 12 and 13 in succession cyclically. The motor 16 is controlled by an output from the adder 6 so as to cause the switch to commutate only when a colour burst is detected. Thus the switch commutates only for a colour television signal and is set with the contact 14 connected to, for example, contact 12 for a black and white signal. The contact 14 is connected to a second input of the adder 9. The sum signal from the adder 9 is connected to an input of the adder 6 and also to the subtracting input of the subtractor 4. For convenience the digital part of the circuit of FIG. 3 has been shown with single lines representing parallel paths for the different digits. In practice the output of the converter 3 would probably consist of eight bits in parallel, and therefore the components 4 to 14 would all consist of eight elements in parallel except for the output of quantizer 5 which could be, say, 5 bits. Moreover, the adders and subtractors would be provided with carry stages, so that the additions and subtractions are correctly performed. The shifting register 10 would have eight storage elements per stage, all of which would be shifted at the same time, and the shifting between the stages of the register 10 would be carried out at the sampling rate. In the example under consideration, the length of the shifting register 10 has been chosen to correspond to the number of samples in a scanning line plus any additional samples necessary to perform the algorithms set out above. The commutating switch operates in the direction indicated by the arrow to select the outputs of stages 852, 851 and 850 of the shifting register 10 in turn cyclically, that is to say after selecting the output of the stage 850 the commutating contact 14 moves round to select the output of the stage 852 again.

The operation of the circuit of FIG. 3 will now be described. The delay circuit 7 and the subtraction circuit 8 combine to apply to the first stage of the shifting register 10 the difference between a sampled value and its successor, such as, for example, S10 − S11, then S9 − S10 and then S8 − S9, using the terminology of the algorithms. As these are formed in the preceding line, it is necesary for them to be stored for about a line period and this is achieved by the shifting register 10. When the sample value of the instant S3 is produced in digital form from the converter 3, it is applied to the input of the subtractor 4 at the same time as the output of the adder 9 is applied to the subtracting input of the subtractor 4. The output of the adder 9 is the sum of the immediately preceding sample delayed by the delay unit 7 plus the difference from the previous line of the scan selected by the commutating switch. It will thus be apparent that the difference output from the subtractor 4 is equal to the difference between S3, the actual value occurring at the instant S3, and S3 which is the predicted value resulting from the algorithm. The function of the adder 6 is simply to produce at its output an approximation to the output of the converter 3, after it has been reduced by the subtractor 4 as a result of the subtraction from it of the output of the adder 9, by adding to the difference output the output of the adder 9.

After the digital difference output resulting from the sampling instant S3 has been produced, outputs representing the values at S2 and S1 and so on are produced in a similar manner, the commutating switch selecting the outputs of the last stages of the shifting register 10 in turn to produce the algorithms correctly. It will be appreciated that the commutating switch must be synchronised with the appropriate phase of the sub-carrier signal.

If the sampling instants are chosen such that some of them are aligned with the U-axis, similar algorithms to those described above can be produced, but it is necessary to choose more widely separated sampling instants in the preceding line to obtain the required equivalence of the sub-carrier phases. This wider separation means that the prediction is not so good so that described above with regard to the luminance component. The commutating switch may be stopped or overridden if no colour burst is detected in the incoming signal as described above so as to improve the performance of the apparatus on black and white television signals.

Figure 4:
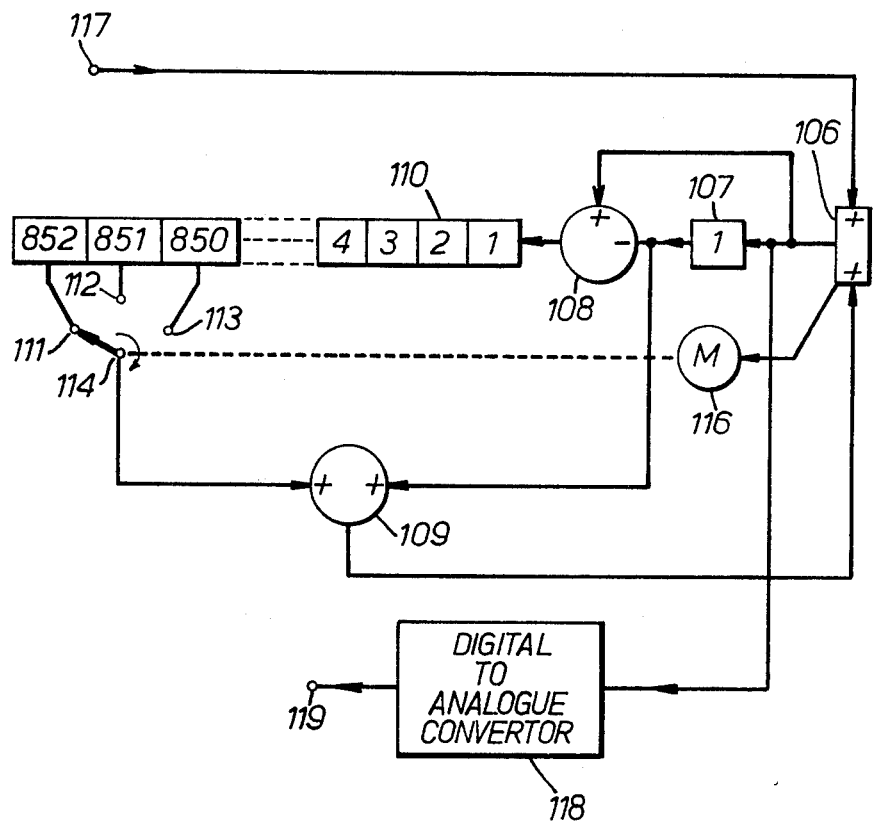
FIG. 4 is a block diagram of one form of decoding apparatus.

A decoder for the signals produced by the encoder shown in FIG. 3 could be constructed as shown in FIG. 4 in which components similar to those used in the encoder described above with reference to FIG. 3 have reference numerals increased by 100 relative to those used in FIG. 3. As in FIG. 3, single lines are used in FIG. 4 to represent parallel paths for the different digits in the digital part of the circuit.

In FIG. 4, the incoming digitally coded signal is applied via a terminal 117 to an input of an adder 106, the sum output of which is applied directly to the positive input of a subtractor 108 and via a unit sampling period delay 107 to the negative input of the subtractor 108. The difference output of the subtractor 108 is applied to the first stage of an 852 stage shifting register 110 which is stepped at the sampling rate. Stages 850, 851 and 852 of the register 110 are connected to respective switch contacts 113, 112 and 111, which contacts are scanned by a moving contact 114 driven by a motor 116 timed by a signal derived from a colour burst, for example, in the adder 106. The contact 114 and the output of the delay 107 are connected to respective inputs of an adder 109, the sum output of which is connected to a second input of the adder 106.

The output of the adder 106 is also connected to the input of a digital to analogue converter 118 which produces an analogue output signal corresponding to the original television signal at the terminal 119.

The operation of FIG. 4 is similar to that of FIG. 3 in that the incoming digitally coded samples are accumulated in accordance with the same algorithm as is used by FIG. 3 by the adder 106 in conjunction with the recirculation loop coupling the output of the adder 106 to one of its inputs.

All of the modifications described above for the encoder would need to be applied to the decoder when it is used for decoding the signals from a modified encoder. The control of the commutating switch could be effected in response to the presence or absence of a colour burst in the decoded signal or a separate control signal could be transmitted for this purpose from the encoder.

Although the invention has been described with reference to a specific embodiment and a particular form of apparatus has been described for carrying out the method of the embodiment, it will be appreciated that modifications can be made without departing from the invention. The analogue to digital conversion need not be linear. The commutating switch need not be a mechanical one as shown, but may be constructed from suitable electronic switches.

I claim:

1. A method of digitally encoding a PAL colour television signal having a base band luminance component and a phase and amplitude modulated sub-carrier wave representing chrominance, the sense of the phase modulation being switched about a datum phase so as to alternate in successive lines, in which at each of a regular succession of sampling instants an instantaneous value of the signal has subtracted from it a combination of previously sampled values of the signal, the difference being encoded in digital form; wherein the sampling frequency is three times the frequency of the sub-carrier, with sampling instants synchronised with the datum phase of the sub-carrier or a phase in quadrature with the datum phase, and the value of the signal at a present sampling instant has subtracted from it both the value at a preceding sampling instant and the difference between the values at first and second sampling instants approximately one line period earlier, the value at the first sampling instant being subtracted from the value of the second sampling instant to produce the last-mentioned difference, the first and second sampling instants being chosen so that they are spaced the same number of sampling intervals as the present and preceding sampling instants, and that the sub-carrier components, if unmodulated, would cancel each other.

2. A method according to claim 1 wherein the sampling instants are synchronised with a phase of the sub-carrier signal which is in quadrature with the datum phase, the first and second sampling instants being chosen so that the phase of the sub-carrier, if unmodulated, at the first sampling instant is opposite to that at the present sampling instant, and that at the second sampling instant is opposite to that at the preceding sampling instant the value at which is subtracted from that at the present sampling instant.

3. A method according to claim 2 wherein the present sampling instant is adjacent the preceding sampling instant at which the value is subtracted from that at the present sampling instant, and the first and second sampling instants are adjacent.

4. A method according to claim 3 wherein the first and second sampling instants are selected by a three step cyclic switching operation from a group of four sampling instants for each group of three successive present sampling instants.

5. A method according to claim 1 wherein the sampling instants are synchronised with the datum phase of the sub-carrier, the preceding sampling instant, at which the value is subtracted from that at the present sampling instant, is separated from the present sampling instant by a single sampling instant, and the first and second sampling instants are separated by a single sampling instant.

6. A method of decoding a digital signal to produce a PAL colour television signal having a base band luminance component and a phase and amplitude modulated sub-carrier wave representing chrominance, the sense of the phase modulation being switched about a datum phase so as to alternate in successive lines, the digital signal having a succession of values corresponding to respective sampling instants occurring regularly at a frequency three times that of the sub-carrier, the method including producing a digital colour television signal by adding to the value at a present sampling instant the accumulated total of the values at preceding sampling instants and the difference between the values at first and second sampling instants approximately one line period earlier, the first and second sampling instants being chosen so that the phase difference of the sub-carrier, if unmodulated, between the first and second sampling instants is equal to the phase difference of the sub-carrier, if unmodulated, between the present sampling instant and the nearest preceding sampling instant at which the value contributes to the accumulated total.

7. A method according to claim 6 including applying the digital television signal to a digital to analogue converter to produce a successiion of analogue values and deriving a substantially continuous analogue signal output from the successive analogue values.

8. Apparatus for digitally encoding a PAL colour television signal having a base band luminance component and a phase and amplitude modulated sub-carrier wave representing chrominance, the sense of the phase modulation being switched about a datum phase so as to alternate in successive lines, the apparatus including means for sampling at each of a regular succession of sampling instants the instantaneous value of the signal, the sampling frequency being three times the sub-carrier frequency with the sampling instants synchronised with the datum phase, means for converting the samples to digital form, means for applying the digital samples via a subtraction circuit to a first input of an adder, means for forming the difference between the present output and a previous output of the adder, selectable delay means connected to the output of the difference means and having three different delays each of about one line period, the delay selected being changed in a three stage cycle with each successive output of the difference means, means for combining the delayed output and the previous output of the adder to produce a resultant signal which is applied to a second input of the adder and to the subtraction circuit, the output of the subtraction circuit providing the digital output of the apparatus.

9. Apparatus according to claim 8 including means for enabling the switching of the delay of the delay means only if a colour burst is detected in the output of the adder.

10. Apparatus for decoding a digital signal to produce a PAL colour television signal having a base band luminance component and a phase and amplitude modulated sub-carrier wave representing chrominance, the sense of the phase modulation being switched about a datum phase so as to alternate in successive lines, the digital signal having a succession of values corresponding to respective sampling instants occurring regularly at a frequency three times that of the sub-carrier, the apparatus including an adder having a first input for the digital signal, means for forming the difference between the present output and a previous output of the adder, selectable delay means connected to the output of the difference means and having three delays each of about one line period, the delay selected being changed in a three stage cycle with each successive output of the difference means, means for combining the delayed output and the output of the adder to produce a resultant signal which is applied to a second input of the adder, whereby the output of the adder is a PAL colour television signal in digital form.

11. Apparatus according to claim 10 including digital to analogue conversion means connected to the output of the adder to produce the PAL colour television signal.

12. A transmission system for a PAL colour television signal comprising, in combination
a. encoding apparatus for digitally encoding a PAL colour television signal having a base band luminance component and a phase and amplitude modulated sub-carrier wave representing chrominance, the sense of the phase modulation being switched about a datum phase so as to alternate in successive lines, the encoding apparatus including means for sampling at each of a regular succession of sampling instants the instantaneous value of the signal, the sampling frequency being three times the sub-carrier frequency with the sampling instants synchronised with the datum phase, means for converting the samples to digital form, means for applying the digital samples via a subtraction circuit to a first input of an adder, means for forming the difference between the present output and a previous output of the adder, selectable delay means connected to the output of the difference means and having three different delays each of about one line period, the delay selected being changed in a three stage cycle with each successive output of the difference means, means for combining the delayed output and the previous output of the adder to produce a resultant signal which is applied to a second input of the adder and to the subtraction circuit, the output of the subtraction circuit providing the digital output of the encoding apparatus; and b. apparatus for decoding said digital output to reproduce a PAL colour television signal having a base band luminance component and a phase and amplitude modulated subcarrier wave representing chrominance, the sense of the phase modulation being switched about a datum phase so as to alternate in successive lines, the digital signal having a succession of values corresponding to respective sampling instants occurring regularly at a frequency three times that of the sub-carrier, the decoding apparatus including an adder having a first input for the digital signal, means for forming the difference between the present output and a previous output of the adder, selectable delay means connected to the output of the difference means and having three delays each of about one line period, the delay selected being changed in a three stage cycle with each successive output of the difference means, means for combining the delayed output and the output of the adder to produce a resultant signal which is applied to a second input of the adder, whereby the output of the adder is a PAL colour television signal in digital form; and c. means for converting the said signal in digital form to analog form.

\* \* \* \* \*